(12) United States Patent
Boa et al.

(10) Patent No.: US 6,560,599 B1
(45) Date of Patent: May 6, 2003

(54) METHOD AND APPARATUS FOR MARKING A HASH TABLE AND USING THE MARKING FOR DETERMINING THE DISTRIBUTION OF RECORDS AND FOR TUNING

(75) Inventors: Douglas S. Boa, Redmond, WA (US); Simon M. Meacham, Redmond, WA (US); Barry M. Nolte, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/343,625

(22) Filed: Jun. 30, 1999

(51) Int. Cl.[7] .............................................. G06F 17/30
(52) U.S. Cl. .......................... 707/7; 707/100; 707/101; 707/102
(58) Field of Search ............................... 370/392; 707/6, 707/10, 101, 206, 8, 100, 102, 103 R, 104.1; 341/51; 395/400; 380/25

(56) References Cited

U.S. PATENT DOCUMENTS

| | | | | |
|---|---|---|---|---|
| 5,379,391 A | * | 1/1995 | Belsan et al. ................ | 395/400 |
| 5,463,390 A | * | 10/1995 | Whiting et al. ................ | 341/51 |
| 5,692,177 A | * | 11/1997 | Miller ............................ | 707/8 |
| 5,757,915 A | * | 5/1998 | Aucsmith et al. ............. | 380/25 |
| 5,848,423 A | * | 12/1998 | Ebrahim et al. ............ | 707/206 |
| 5,897,637 A | * | 4/1999 | Guha .......................... | 707/101 |
| 6,058,392 A | * | 5/2000 | Sampson et al. .............. | 707/6 |
| 6,212,525 B1 | * | 3/2001 | Guha .......................... | 707/101 |
| 6,212,184 B1 | * | 4/2001 | Venkatachary et al. ...... | 370/392 |
| 6,212,521 B1 | * | 4/2001 | Minami et al. ................ | 707/10 |
| 6,480,858 B1 | * | 11/2002 | Boa et al. .................... | 707/101 |

OTHER PUBLICATIONS

Slot et al., On Tape Versus Core; An Application of Space Efficient Perfect Hash Fuctions To The Invariance of Space, 1994, ACM, pp. 391–400.*

* cited by examiner

Primary Examiner—Frantz Coby
(74) Attorney, Agent, or Firm—Merchant & Gould, P.C.; Mark R. Hennings (57) ABSTRACT

A method, apparatus, software and data structure is disclosed for more efficient access times for linear operations in a hash table. A plurality of actual data records and a plurality of marker data records are inserted in a hash table using a hash function. The actual data records and marker data records have a logical ordering specified by a key and are threaded into the hash table to allow linear access by walking the hash table. The logical ordering of the actual data records and marker records is lost upon entry into the hash table, and the keys of the marker data records are distributed at known positions throughout the range of the keys of the actual data records. If when hashing a given key no record exists in the database for the given key, one of the keys for the marker data records are hashed to locate the associated marker data record in the hash table. Distribution of data records according to the hash function is also determined by locating a marker data record in the database and examining the position of adjacent records. The distribution of records provides a measure of performance of the hash table and for tuning of the hash table.

20 Claims, 5 Drawing Sheets

METHOD AND APPARATUS FOR MARKING A HASH TABLE AND USING THE MARKING FOR DETERMINING THE DISTRIBUTION OF RECORDS AND FOR TUNING

COPYRIGHT NOTICE AND PERMISSION

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright© 1999, Microsoft, Inc.

TECHNICAL FIELD OF THE INVENTION

The present invention pertains generally to hash tables, and more particularly to a system for determining the distribution of records in a hash table, and tuning the hash table in response to such determinations.

REFERENCE TO RELATED APPLICATIONS

This application is related to a co-pending application having attorney docket number 777.256US1 Method and Apparatus for Finding Nearest Logical Record in a Hash Table which is assigned to the same assignee as the present application, filed on the same day herewith and hereby incorporated by reference.

BACKGROUND OF THE INVENTION

Linear hash tables optimize access time by evenly distributing records across the underlying table. Ideally, records may be inserted into and accessed with a single hashing operation. Furthermore, it is desirable to use system memory efficiently, to, among other things, optimize the quantity of data that may be held in memory simultaneously. If the hashing function spreads data too sparsely across the hash table index, memory optimization may be diminished. On the other hand, if the data is too closely spaced or "clumped" together, multiple access operations may be required to insert or locate a record. Accordingly, tuning or adjusting the hashing function to achieve better performance is a major goal of hash table design and operation.

The hashing function for any given data structure is thus selected to achieve optimal distribution of records in the hash table. In actual operation, the selected function is often checked for its performance, which may be done as records are initially inserted into the hash table, or later by analysis of the spread of data. Obtaining statistics for this analysis, however, may be cumbersome and time consuming. For example, in the case of a threaded linear hash table, the entire table may need to be "walked" in order to assess the distribution of data across the table. In the case of large databases, this operation may be time prohibitive to perform with any degree of regularity. Accordingly, there is a need for improved or alternate ways to assess the efficiency of the distribution of records in a hash table.

SUMMARY OF THE INVENTION

According to various example embodiments of the invention, there is provided a system for analyzing the efficiency or performance of a hash function by insertion of marker data records with known keys in a hash table together with the actual data records threaded in the hash table, and using the marker data records to analyze the distribution of actual data records around a marker data record.

In one aspect of the invention, the hash table is entered at various markers. A desired number of records is then walked using pointers and recording the index number to the hash table for each record. The index numbers are then analyzed to determine an efficiency of distribution of logically consecutive records. The hashing function may then be tuned based on the distribution as compared to a desired distribution.

DETAILED DESCRIPTION OF THE INVENTION

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

Hardware and Operating Environment

Figure 1:
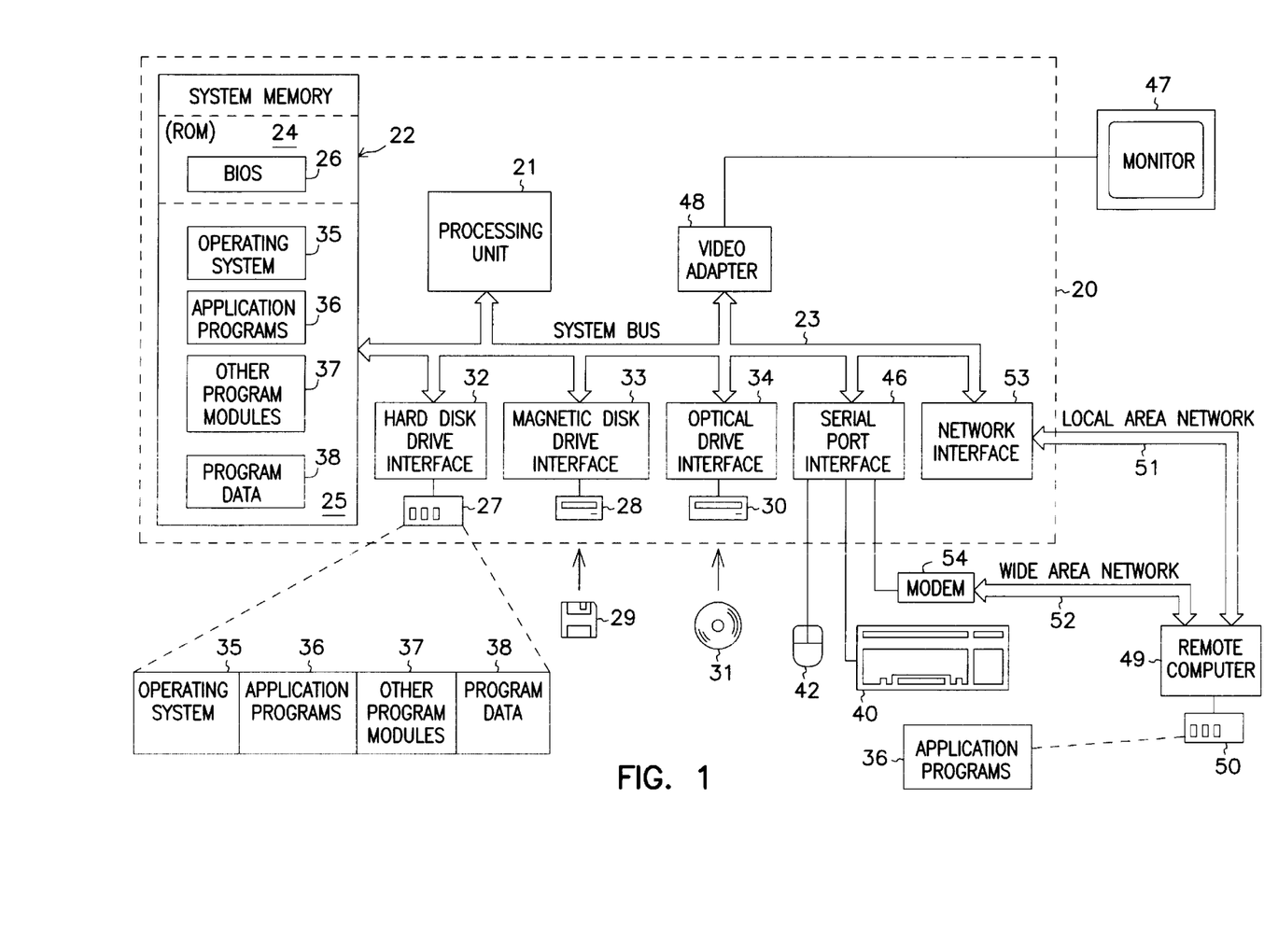
FIG. 1 illustrates a simplified overview of an example embodiment of a computing environment for the present invention.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc. that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components, including the system memory, to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk (not shown), a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored or encoded in a machine readable medium such as the hard disk, magnetic disk 29, optical disk 31, ROM 24, RAM 25, or an electrical signal such as an electronic data stream through a communications channel, including an operating system 35, one or more application programs 36, other program modules 37, and program data 38. As described below in more detail, operating system 35 may allocate memory such as RAM 25 into kernel-mode memory or user-mode memory. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, an embedded computer or any other type of computer; the invention is not so limited. Such a computer typically includes one or more processing units as its processor, and a computer-readable medium such as a memory. The computer may also include a communications device such as a network adapter or a modem, so that it is able to communicatively couple other computers.

EXAMPLE EMBODIMENTS OF THE INVENTION

Figure 2A:
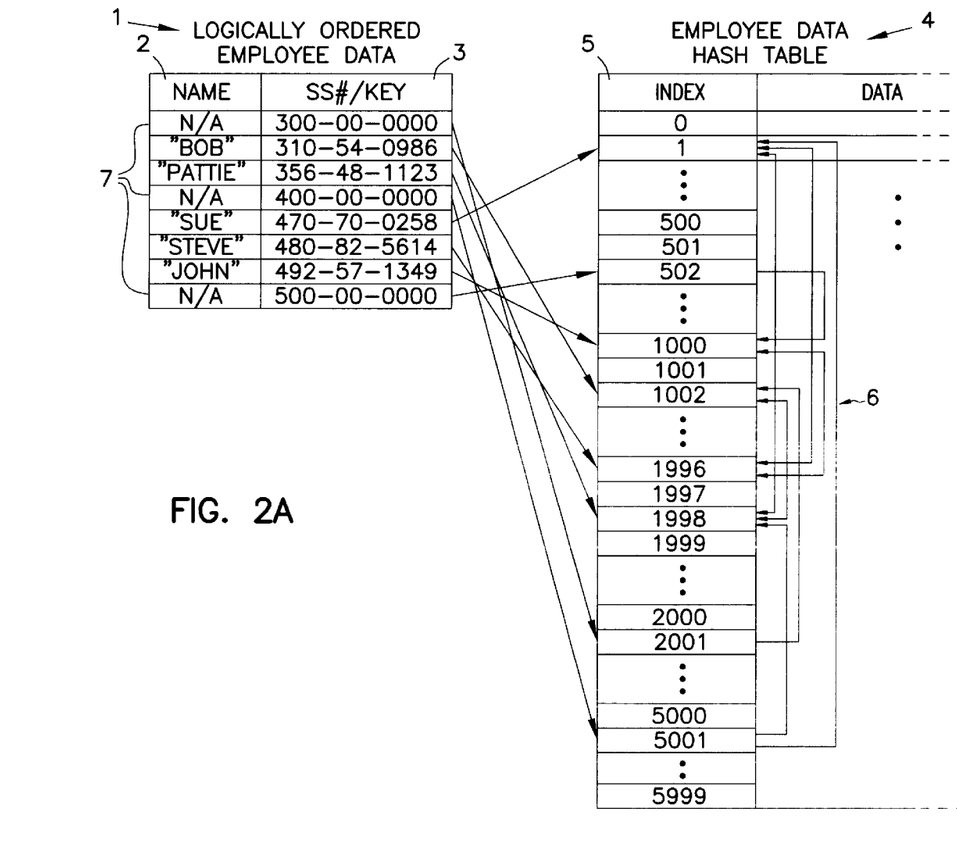
FIGS. 2A and 2B illustrate example embodiments of a hash table according to the present invention

Referring now to FIG. 2A and Table 1; there is illustrated an example embodiment of the invention demonstrating the use of marking records in a hash table in order to provide a more efficient system for performance analysis and hash table tuning. In this example, employee records 1 include an employee name 2, and a social security number 3 used as key k for a hash function F(k) used to map employee records 1 to a hash table 4 with an index 5 space of 6000 (0–5999). Records 1 are logically ordered according to social security number. In addition, "marker" records 7 have been added to the actual records 1 and added to the hash table 4. As will be explained further below, these marker records are disposed at known locations in the hash table, and provide a known point of entry in the case where no actual record exists for a specified key. The hash function F(k), in this example, has mapped the actual data records and marker data records to the hash table indexes indicated in the table below, wherein the marker data records correspond to keys 300-00-000, 400-00-000 and 500-00-000.

TABLE 1

| Social Security Number | Hash Table Index | Marker Record (Y/N) | Next Record Pointer | Previous Record Pointer |
|---|---|---|---|---|
| 300-00-0000 | 2001 | Y | 1002 | N/A |
| 310-54-0986 | 1002 | N | 1998 | N/A |

TABLE 1-continued

| Social Security Number | Hash Table Index | Marker Record (Y/N) | Next Record Pointer | Previous Record Pointer |
|---|---|---|---|---|
| 356-48-1123 | 1998 | N | 1 | 1002 |
| 400-00-0000 | 5001 | Y | 1 | 1998 |
| 470-70-0258 | 1 | N | 1996 | 1998 |
| 480-82-5614 | 1996 | N | 1000 | 1 |
| 492-57-1349 | 1000 | N | N/A | 1996 |
| 500-00-0000 | 502 | Y | N/A | 1000 |

As further illustrated in FIG. 2A and Table 1, the hash table includes an indicator or flag specifying the marker records, so that they can be distinguished from records containing actual data. Further, it is noted that the marker records are transparent to the next and previous record pointers for actual records. In other words, according to one example embodiment, actual records in the hash table do not contain any pointers to the marker records. On the other hand, marker records do include pointers to the actual records preceding and following them. In an alternate embodiment, actual records may include pointers to marker records, and such marker records may be disregarded when walking the hash table to locate preceding and proceeding actual records. As also illustrated in FIG. 2A and Table 1, each record in the hash table is threaded by the inclusion of pointers 6 to the next succeeding and next preceding logically ordered record. With this threading, it is possible to "walk" to adjacent logically ordered records by following pointers 6. In addition, as described in more detail in U.S. application Ser. No. 09/345,176 entitled, "METHOD AND APPARATUS FOR FINDING NEAREST LOGICAL RECORD IN A HASH TABLE ", and filed on Jun. 30, 1999 now U.S. Pat. No. 6,480,858 and incorporated herein by reference, the marking records can be used to facilitate entry into the hash table at known locations to perform linear access operations such as find nearest preceding or proceeding records, given a search key.

Figure 3:
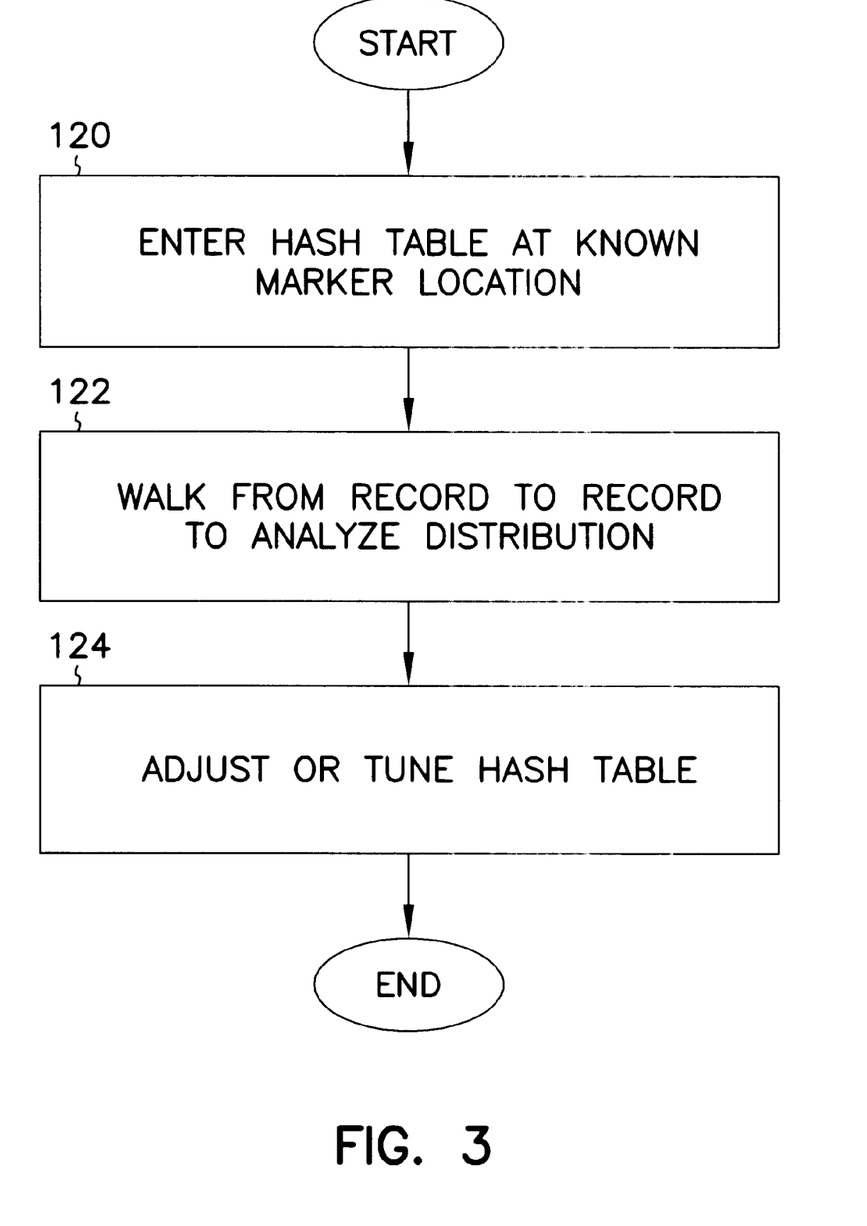
FIGS. 3, 4 and 5 illustrate example embodiments of the operation of data storage systems according the present invention.

Using the marker data records inserted into the hash table along with the actual data records 1, the present invention provides a mechanism for performing statistical analysis of the distribution of data across the hash table. Namely, according to this example embodiment of the invention, as illustrated in FIG. 3, the distribution of records in the database may be analyzed by entering the hash table at one or more of the known marker record locations (120), and walking from record to record, either forward or backward, to determine how records are scattered around the marker record (122). In particular, at each record, the spacing between the indexes of adjacent logical records provides an indication of the performance of the hash function to spread records appropriately throughout the hash table. In addition the spacing between indexes also provides an indirect indication of the physical spacing of the records in the physical address space. This examination thus provides an indication of the density of the records around any given hash key, and in turn this information can be used to develop a view of the distribution of physical records in the data store. Once this distribution is known, the hash function can be adjusted or tuned (124). For instance, if data records are clumped together around a given key, the hash function can be adjusted to spread records out in this region, or conversely, if the records are sparse, the hash function can be adjusted to increase the density of records around a given mark. Alternatively, distribution around more than one or all the marker data record locations can be analyzed collectively and the hash function's performance analyzed on this basis and any adjustments made in response thereto. It is noted that the above described embodiments refer to the hash table records by an index, and that such index may map directly to a memory or storage location, or may be indirectly mapped to such locations, or mapped in any suitable manner, or further that such index may comprise an address for a location. In other words, the invention is in no way limited in this respect.

While the example of FIG. 2A illustrates a periodic distribution of marker records in the hash table, the invention is not limited in this respect. In another example embodiment, for instance, the marker records may be distributed throughout the hash table according to any other simple or complex function providing a greater number of marker records in certain segments of the database, for example those with a higher density of actual records, and a lesser number of marker records in other segments of the database with a lower density of actual records. Alternatively, a marker record may be inserted every x number of actual data records, such as every 10 records, or every 100 records. The function may comprise a mathematical computation, or provide a look up table with a plurality of ranges of keys each pointing to a corresponding marker record. According to yet another embodiment, one or more different functions may be used to distribute marker records in the same hash table.

According to yet another example embodiment of the invention, marker records may be added to the hash table upon initialization of the table and remain constant, or be added to or deleted from the hash table as the actual records in the hash table change over time. Tuning of the marker interval frequency in the ordered data can increase access times for linear operations at the expense of hash table size. For instance, according to one example embodiment illustrated in FIG. 4, the distribution of actual records in the hash table is evaluated at the time the hash table is initiated and loaded with records (130), and marker records are distributed throughout the data based on the distribution of actual records (132). According to another example embodiment illustrated in FIG. 5, the distribution of actual records in the hash table is evaluated from time to time (140), and additional marker records added or deleted based on changes in the distribution (142). Record distribution may be analyzed by any means, for example by analysis of the database statistics that may be generated by database software.

Figure 2B:
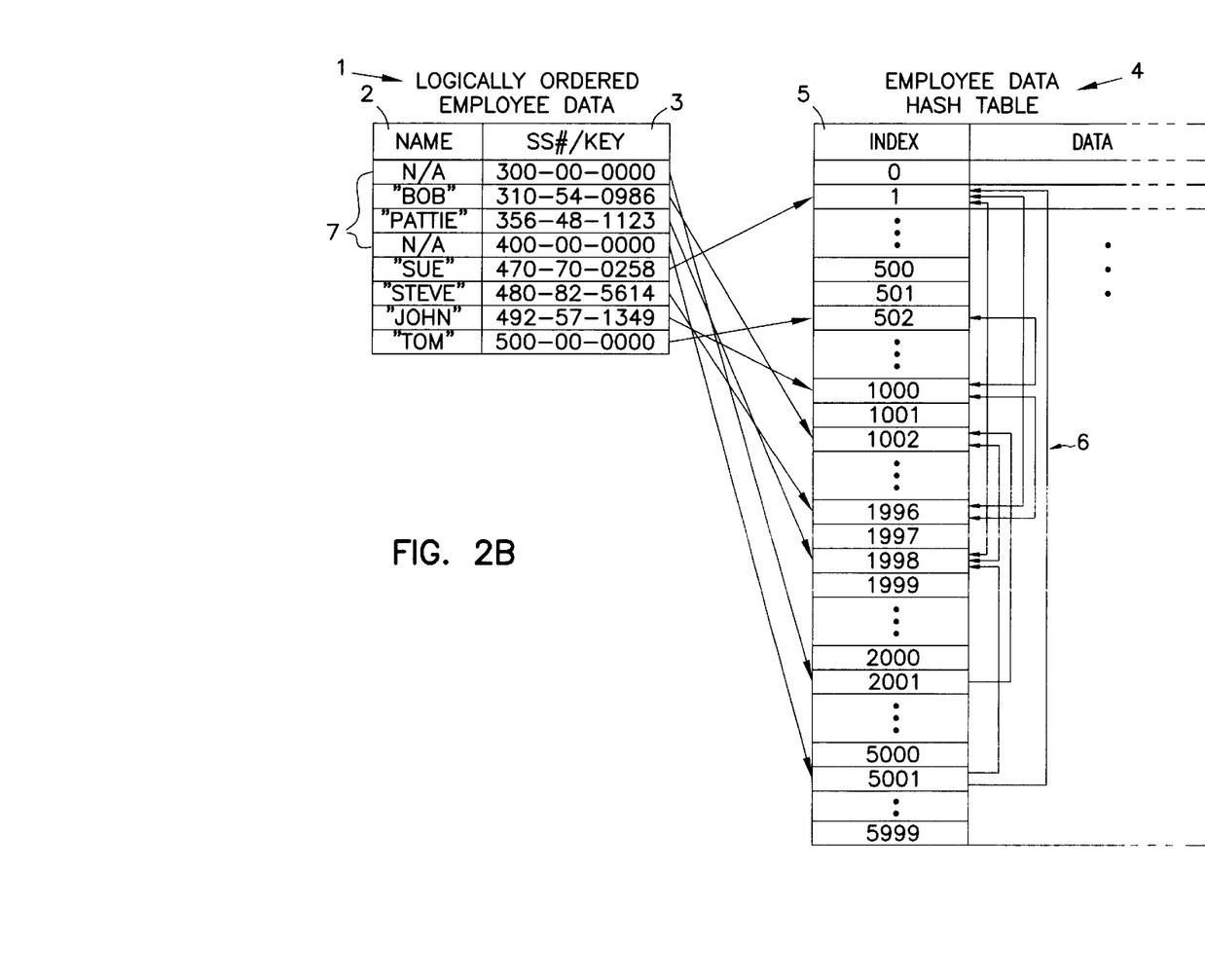

Furthermore, according to one example embodiment of the invention, if an actual record exists at a location identified for placement of a marker record, the marker record is not placed at such location. In this situation, the marker record function M(k) will point to the actual record instead of what would otherwise be a marker record. Furthermore, should an actual record be added to the hash table at the location of a marker record, the actual record will be written over the marker record. Similarly, if an actual record at a location designated for a marker record is deleted, a marker record will be added to the hash table to replace the deleted record. FIG. 2B illustrates an example of an actual record at the location of the marker record for the social security number 500-00-0000.

Thus, the present invention provides for inserting marker records at predetermined intervals when no actual record in the ordered data exists for a given key. Thus, the invention guarantees finding records at known intervals in the hash table which can be used to analyze the distribution of physical records in the data store and make adjustments to the hash function as desired for optimization.

Thus, while the embodiments of the invention have been described with specific focus on their embodiment in a software implementation, the invention as described above is not limited to software embodiments. For example, the invention may be implemented in whole or in part in hardware, firmware, software, or any combination thereof.

The software of the invention may be embodied in various forms such as a computer program encoded in a machine readable medium, such as a CD-ROM, magnetic medium, ROM or RAM, or in an electronic signal. Further, as used in the claims herein, the term "module" shall mean any hardware or software component, or any combination thereof Furthermore, software in a module may be clustered together or may be spread throughout other code.

What is claimed is:

1. A method comprising:
    inserting a plurality of actual data records and at least one marker data record in a hash table using a hash function, wherein the actual data records are not logically ordered in the hash table, wherein one or more of the actual data records and the marker data record in the hash table include a pointer to a logically preceding and proceeding actual data record, and the at least one marker data record has a known key; and
    hashing the known key for the marker data record to locate the marker data record in the hash table, and walking to one or more adjacent actual data records to determine the distribution of data records resulting from the hash function.

2. A method according to claim 1 including inserting one or more additional marker data records to the hash table at corresponding different known keys.

3. A method according to claim 2 wherein the known keys of the marker data records are chosen according to a marker record distribution function.

4. A method according to claim 3 wherein the distribution function is periodic.

5. A method according to claim 4 wherein the known keys are spaced at regular intervals.

6. A method according to claim 1 wherein the hash function used to insert actual data records is changed based on the determined distribution of data records.

7. A method comprising:
    inserting a plurality of actual data records and a plurality of marker data records in a hash table using a hash function, wherein the actual data records and marker data records have a logical ordering specified by a key, the keys of the actual data records have a range, the actual data records and marker records are not logically ordered in the hash table, one or more of the actual data records and one or more of the marker data records in the hash table include a pointer to a logically preceding and proceeding actual data record, and the keys of the marker data records are distributed at known positions throughout the range of the keys of the actual data records; and
    hashing a known key for the marker data record to locate the marker data record in the hash table, and walking to one or more adjacent actual data records to determine the distribution of data records resulting from the hash function.

8. A method according to claim 7 including inserting one or more additional marker data records into the hash table in response to adding one or more additional actual records to hash table.

9. A method according to claim 8 wherein the known keys of the marker data records are identified using a marker record distribution function.

10. A method according to claim 9 wherein the distribution function is periodic.

11. A method according to claim 10 wherein the known keys are spaced at regular intervals.

12. A method according to claim 9 wherein the mark records are inserted so as to guarantee a record will be present for known keys in the hash table.

13. A method according to claim 6 wherein the hash function used to insert actual data records is changed based on the determined distribution of data records.

14. A system comprising:
    a data storage medium storing a hash table including a plurality of actual data records and at least one marker data record inserted in the hash table using a hash function, wherein the actual data records are not logically ordered in the hash table, and the at least one marker data record has a known key; and
    a record distribution examination module receiving a known key and outputting an indication of the distribution of actual data records around the marker data record corresponding to the known key.

15. A system according to claim 14 wherein the module comprises a computer program executing on a computing platform.

16. A system according to claim 15 wherein the data storage medium is one or more of the following: random access memory, magnetic storage medium, and optical storage medium.

17. A computer readable media having instructions stored thereon for causing a computer to perform a method comprising:
    inserting a plurality of actual data records and at least one marker data record in a hash table using a hash function, wherein the actual data records are not logically ordered in the hash table, wherein one or more of the actual data records and the marker data record in the hash table include a pointer to a logically preceding and proceeding actual data record, and the at least one marker data record has a known key; and
    hashing the known key for the marker data record to locate the marker data record in the hash table, and walking to one or more adjacent actual data records to determine the distribution of data records resulting from the hash function.

18. A computer readable media having instructions stored thereon for causing a computer to perform a method comprising:
    inserting a plurality of actual data records and a plurality of marker data records in a hash table using a hash function, wherein the actual data records and marker data records have a logical ordering specified by a key, the keys of the actual data records have a range, the actual data records and marker records are not logically ordered in the hash table, one or more of the actual data records and one or more of the marker data records in the hash table include a pointer to a logically preceding and proceeding actual data record, and the keys of the marker data records are distributed at known positions throughout the range of the keys of the actual data records; and
    hashing a known key for the marker data record to locate the marker data record in the hash table, and walking to one or more adjacent actual data records to determine the distribution of data records resulting from the hash function.

19. The computer readable medium of claim 18, wherein the method further comprises inserting one or more additional marker data records into the hash table in response to adding one or more additional actual records to hash table.

20. The computer readable medium of claim 18, wherein the known keys of the marker data records are identified using a marker record distribution function.

* * * * *

UNITED STATES PATENT AND TRADEMARK OFFICE
CERTIFICATE OF CORRECTION

PATENT NO. : 6,560,599 B1  Page 1 of 1
APPLICATION NO. : 09/343625
DATED : May 6, 2003
INVENTOR(S) : Boa et al.

It is certified that error appears in the above-identified patent and that said Letters Patent is hereby corrected as shown below:

Column 1, lines 25-26, "This application is related to a co-pending application having attorney docket number 777.256US1..." should read --This application is related to a co-pending application filed on June 30, 1999 now U.S. Patent No. 6,480,858...--

Figure 4:
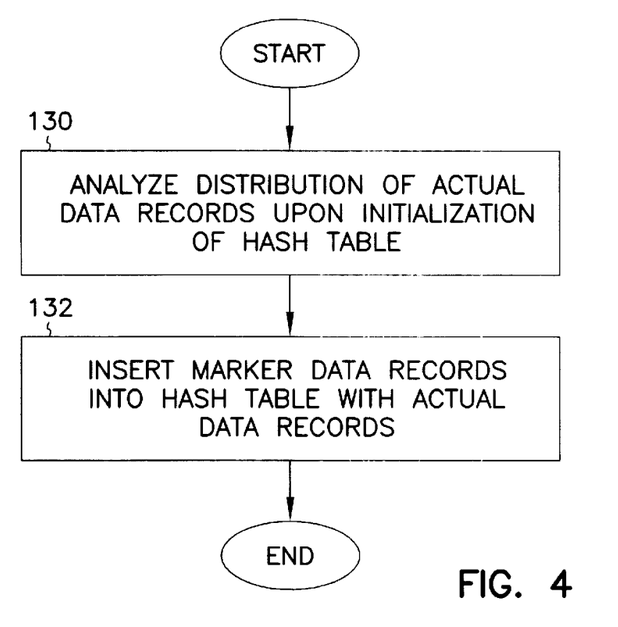
Figure 5:
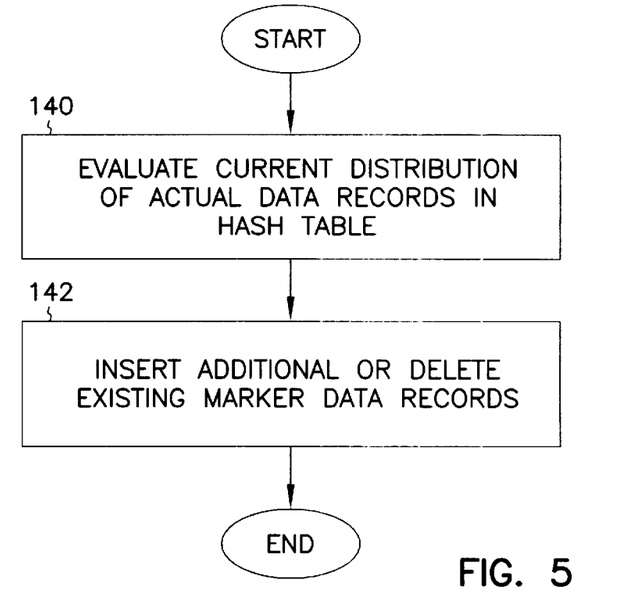

Column 2, line 21, "FIGS. 3, 4 and 5 illustrate example embodiments of the operation of data storage systems according the present invention." should read --FIGS. 3, 4 and 5 illustrate example embodiments of the operation of data storage systems according to the present invention.--

Signed and Sealed this

Twenty-second Day of January, 2008

JON W. DUDAS
*Director of the United States Patent and Trademark Office*